United States Patent
Bharadwaj et al.

(10) Patent No.: US 10,944,693 B2
(45) Date of Patent: Mar. 9, 2021

(54) ROUTING FLITS IN A NETWORK-ON-CHIP BASED ON OPERATING STATES OF ROUTERS

(71) Applicant: Advanced Micro Devices, Inc., Santa Clara, CA (US)

(72) Inventors: Srikant Bharadwaj, Bellevue, WA (US); Shomit N. Das, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 103 days.

(21) Appl. No.: 16/188,900

(22) Filed: Nov. 13, 2018

(65) Prior Publication Data

US 2020/0153757 A1   May 14, 2020

(51) Int. Cl.
  *H04L 12/933*   (2013.01)
  *H04L 12/775*   (2013.01)

(52) U.S. Cl.
  CPC ............ *H04L 49/109* (2013.01); *H04L 45/58* (2013.01)

(58) Field of Classification Search
  CPC ............................. H04L 45/58; H04L 49/109
  See application file for complete search history.

(56) References Cited

U.S. PATENT DOCUMENTS

| | | | |
|---|---|---|---|
| 2011/0069612 A1* | 3/2011 | Yamaguchi | H04L 45/12 370/225 |
| 2012/0057467 A1* | 3/2012 | Yoshida | H04L 47/283 370/238 |
| 2012/0287821 A1* | 11/2012 | Godfrey | H04L 45/02 370/256 |
| 2013/0051397 A1* | 2/2013 | Guo | H04L 45/00 370/400 |
| 2013/0138858 A1* | 5/2013 | Adler | G06F 13/366 710/305 |
| 2014/0328208 A1* | 11/2014 | Norige | H04L 45/06 370/254 |
| 2015/0036681 A1* | 2/2015 | Lie | H04L 49/253 370/359 |
| 2015/0236963 A1* | 8/2015 | Kumar | H04L 47/19 370/235 |
| 2015/0333956 A1* | 11/2015 | James | H04L 45/48 709/220 |
| 2016/0344618 A1* | 11/2016 | Oprea | H04L 45/40 |
| 2017/0063625 A1* | 3/2017 | Philip | H04L 41/0889 |
| 2017/0063734 A1* | 3/2017 | Kumar | H04L 49/9005 |
| 2018/0227215 A1* | 8/2018 | Raponi | H04L 45/12 |
| 2019/0087157 A1* | 3/2019 | Gangwar | H04L 49/40 |

* cited by examiner

*Primary Examiner* — Gary Mui
(74) *Attorney, Agent, or Firm* — Park, Vaughan, Fleming & Dowler LLP

(57) ABSTRACT

A system is described that includes an integrated circuit chip having a network-on-chip. The network-on-chip includes multiple routers arranged in a topology and a separate communication link coupled between each router and each of one or more neighboring routers of that router among the multiple routers in the topology. The integrated circuit chip also includes multiple nodes, each node coupled to a router of the multiple routers. When operating, a given router of the multiple routers keeps a record of operating states of some or all of the multiple routers and corresponding communication links. The given router then routes flits to destination nodes via one or more other routers of the multiple routers based at least in part on the operating states of the some or all of the multiple routers and the corresponding communication links.

24 Claims, 5 Drawing Sheets

ROUTING FLITS IN A NETWORK-ON-CHIP BASED ON OPERATING STATES OF ROUTERS

GOVERNMENT RIGHTS

This invention was made with government support under the PathForward Project with Lawrence Livermore National Security (prime contract no. DE-AC52-07NA27344, subcontract no. B620717) awarded by the Department of Energy (DOE). The government has certain rights in this invention.

BACKGROUND

Related Art

Some electronic devices include integrated circuit chips that have multiple nodes such as central processing unit (CPU) cores, graphics processing unit (GPU) cores, caches, and memories that interact when performing operations. For example, nodes may access data in other nodes, may communicate data, messages, or requests to other nodes, etc. during the interactions. Some of these electronic devices include high-speed interconnect networks, or "networks-on-chip," that communicatively couple the nodes. Some of these networks-on-chips include multiple routers arranged in a topology such as a mesh, a Clos, a butterfly, etc. and connected to neighboring routers in the topology via communication links such as buses, wires, or signal routes. Within the topology, some routers are communicatively coupled to one or more nodes, such as a dedicated router included in a CPU core, a memory, etc., while other, intermediate routers are communicatively coupled between two or more routers in the topology (and may not be directly coupled to nodes). During operation, a router may receive a packet (or a communication, a message, a signal, etc.) from a node or a neighboring router, may perform operations to prepare the packet for routing to a destination node such dividing the packet into fixed-length flits, etc., and then route or direct the packet/flits to a next router on a route to the destination node—or to the destination node.

Some of the above-described electronic devices perform operations for conserving electrical power. For example, nodes may support multiple operating states, each operating state associated with a different supply voltage and/or clock frequency. The operating state of nodes—and thus the supply voltage and/or clock frequency—may be separately dynamically adjusted, an operation that is called "dynamic voltage and frequency scaling" or DVFS. For DVFS, a node's supply voltage and/or clock frequency can be lowered to avoid consuming electrical power (such as when the node is idle or not busy) and raised when increased performance is desired from the node.

In some electronic devices, DVFS is extended to routers and/or communication links in the network-on-chip (or routers and/or communication links are included in the nodes themselves, such as in network interfaces, etc.), so that dynamic voltage and frequency scaling is performed for individual routers and/or communication links. When a router and/or communication link is operating in a lower-power operating state (i.e., with reduced voltage and/or frequency), the processing speed and bandwidth of the router and/or communication link is reduced. This can mean that packets/flits routed through the router and/or communication link are slower than when the router and/or communication link is operating in a higher-power operating state. Because nodes rely on high-speed communication via network-on-chips, a slowdown in communication in the network-on-chip is an important concern.

BRIEF DESCRIPTION OF THE FIGURES

Throughout the figures and the description, like reference numerals refer to the same figure elements.

DETAILED DESCRIPTION

Figure 1:
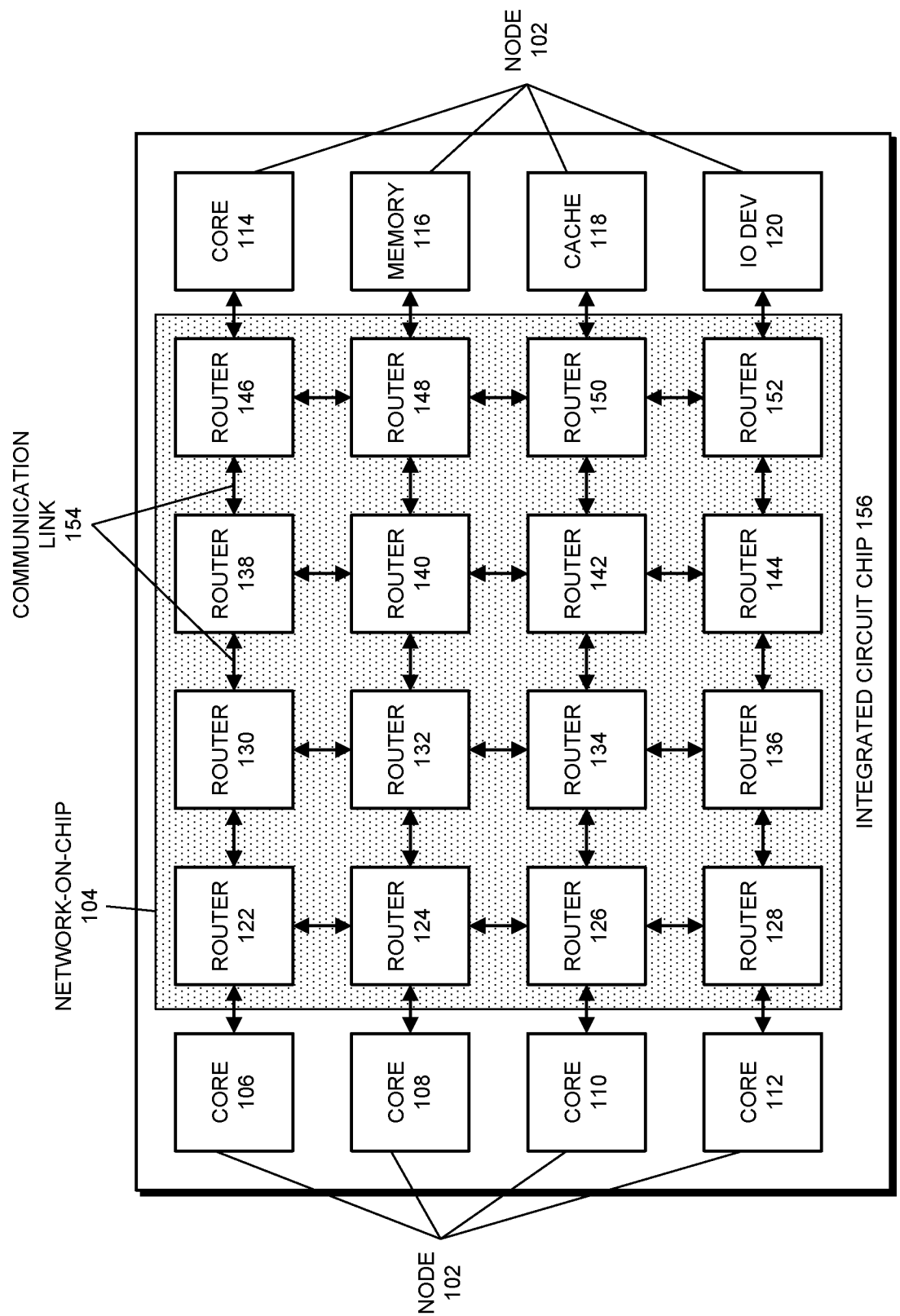
FIG. 1 presents a block diagram illustrating an integrated circuit chip with a number of nodes and a network-on-chip in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following are simplified and general descriptions of some of these terms. Note that the terms may have significant additional aspects that are not recited herein for clarity and brevity and thus the description is not intended to limit the terms.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory).

Packet: a packet is a mechanism for communicating information from a source entity to a destination entity via a communication network. For example, a packet can include information such as data, control information, messages, etc. that is to be communicated from the source entity to the destination entity. Each packet includes bits arranged to form some or all of a header, a payload, and a tail. What is included in the packet, i.e., the particular content, size, arrangement, and existence (or not) of the header, payload, and tail, depends on the standard or protocol that is being used for communication on the communication network and the information being communicated. For example, headers can include information about: the source and/or destination entity (e.g., addresses or other identifiers), a communication session (e.g., a packet sequence number, etc.), the payload (e.g., an indication of payload length and/or type, etc.), etc. As another example, payloads can include: data, control information, commands or requests, etc. As yet another example, tails can include: packet ending patterns, communication session terminators, etc. When in use, a source entity generates or forms a packet in accordance with the corresponding standard or protocol in a network protocol stack, an application, an operating system, a network interface, etc. For example, the source entity can generate a packet that includes data from a computational operation in the payload and a header with information about the destination entity (and possibly other information, such as about the source entity, the communication session, etc.). The source entity then transmits the packet to a destination entity via the communication network.

Flit: a flit is a mechanism for transmitting information via a communication network. Flits are fixed-length portions of data into which packets are divided or fragmented for transmission on a specified level of a communication network (e.g., a physical level). For example, a 64 byte packet, which is 512 bits, can be separated into four 128-bit flits (without considering additional routing and control information that may be added to some or all of the flits). When in use, a router or network interface in or associated with a source entity receives a packet (or a message, a communication, a signal, etc.) from the source entity, determines a route through a communication network to a destination entity indicated in the packet (i.e., at least a next router in the route to the destination entity), divides/fragments the packet into a number of flits, and then uses the route to transmit the flits to the destination entity via the communication network. A router or network interface in or associated with the destination entity receives the flits via the communication network, reassembles the flits into the packet, and forwards the packet to the destination entity. In addition to being used to communicate packets, flits can be used to communicate control and other information from router to router. For example, routers can use flits to communicate operating state information using point-to-point communication—i.e., from a given router to a specific other router, such as a neighboring router—or using broadcasting—i.e., from a given router to multiple routers in a communication network.

Topology: a topology is a specified arrangement, connectivity, and communicative coupling of functional blocks in a system. For example, routers in a network-on-chip may be arranged, connected, and communicatively coupled in a topology such as a Clos, a butterfly, a mesh, etc.

Overview

The described embodiments include an integrated circuit chip that has a number of nodes such as CPUs, GPUs, etc. and a network-on-chip that has multiple routers arranged in a topology. The routers are communicatively coupled to neighboring routers in the topology via separate communication links. Some of the routers are also communicatively coupled to one or more nodes while other, intermediate routers are communicatively coupled between two or more routers in the topology (and are not directly coupled to nodes). During operation, a router in the network-on-chip receives a packet from a node and generates flits therefrom or receives flits from a neighboring router. The router then routes the flits to a next router on a route to a destination node or to a destination router—or routes the flits to the destination node or destination router itself.

In the described embodiments, the routers and/or communication links support multiple operating states in which operating parameters such as supply voltage, clock frequency, current levels, queue lengths, etc. are set to corresponding levels. For example, in some embodiments, the operating states include a lower-power operating state and a higher-power operating state, with the operating parameters set to relatively reduced levels in the lower-power operating state than in the higher-power operating state. In the lower-power operating state, therefore, circuit elements in the routers and/or communication links may operate more slowly or react with more delay and thus transfer flits more slowly than in the higher-power operating state. In some embodiments, the routers and/or communication links are dynamically transitioned between operating states based on operating conditions (e.g., software execution phases, loads on memory or processors, etc.), estimated or predicted system bandwidth demands, commands from a software application or operating system, etc. In some of these embodiments, the transition between operating states involves adjustments to supply voltage and clock frequency and the process can be called dynamic voltage and frequency scaling or DVFS.

In some embodiments, each router in the network-on-chip (or at least some of the routers) keeps a record of current operating states of some or all of the other routers and/or communication links in the network-on-chip. A given router determines routes for flits to destination nodes via one or more other routers in the network-on-chip based at least in part on the operating states of the some or all of the routers and/or communication links. In some embodiments, the router determines the routes in consideration of one or more route properties, such as the estimated time for flits to travel the route, the estimated power consumed in transmitting flits through the route, a number of clock domains crossed, a number of hops in the route, etc. For example, when the route property is the estimated time for flits to travel the route and the goal is to minimize the time, a route through more routers and/or communication links that are in the higher-power operating state may be determined (and preferred, if possible). As another example, when the route property is the estimated power consumed in transmitting flits through the route and the goal is to minimize power consumption, a route through more routers and/or communication links that are in the lower-power operating state may be determined. In some embodiments, along with the above-described route properties, routes are determined in consideration of a congestion or bandwidth availability of particular routers and/or communication links, e.g., to avoid congested or low-bandwidth routers and/or communication links.

In some embodiments, the routers use source routing, for which a given router in a route to a destination node determines a full route for flits. For example, a first router, such as a router that receives a packet from a node and generates flits therefrom, may be the given router that determines the full route. In these embodiments, the record kept by the given router has sufficient information about operating states of the other routers and/or communication links in the network-on-chip to enable the given router to determine the full route for flits to the destination node—and may have operating state information about all of the other routers and/or communication links. In some of these embodiments, although the given router specifies a full route for flits, an intervening router on the route may, based on operating state records kept by the intervening router, adjust or modify the full route so that a different route is used for routing the flits to the destination node. In this way, intervening routers, based on more-current and/or better operating state information can adjust or modify the full route—or at least what remains of the full route from the intervening routers to the destination node.

In some embodiments, routers use on-the-fly routing, for which each router in a route to a destination node locally determines a next router and/or communication link on the route for flits. In other words, when preparing to route a generated or received flit, each router determines a neighboring router and/or communication link where that flit is next to be sent from among two or more neighboring routers and/or communication links. In these embodiments, the record kept by each router has sufficient information about operating states of neighboring routers and/or communication links in the network-on-chip to enable the router to determine the neighboring router and/or communication link where the flit is to be sent. In some embodiments, some or all of the routers have operating state information about as many as all other routers and/or communication links—and may consider the operating state of more than just neighboring routers, i.e., two or more hops worth of downstream routers and/or communication links, when determining the neighboring router and/or communication link to which the flit is to be sent.

In some embodiments, routers in the network-on-chip communicate operating state information to one or more other routers in the network-on-chip. For example, in some embodiments, routers communicate operating state information about themselves and possibly other routers to neighboring routers via a sideband channel, such as a control channel in the communication link or a dedicated operating state channel. As another example, in some embodiments, routers communicate operating state information about themselves and possibly other routers to neighboring routers via flits, such as by sending control flits that include the operating state information directly to the neighboring routers point-to-point. As another example, in some embodiments, broadcasting is supported on the network-on-chip and routers broadcast flits that include operating state information to multiple other routers—and possibly to all other routers. In these embodiments, the flits with the operating state information may be sent (point-to-point or broadcast) at a specified interval (e.g., every N milliseconds), when an operating state of the router changes, when the router receives information that another router has changed operating state, during an idle period or "bubble" on the communication link, etc.

By using the operating state of routers and/or communication links in the network-on-chip to determine routes for flits, the described embodiments enable the selection of routes that are better suited to route properties (e.g., flight time for flits, power consumption for routing flits, clock domains crossed, etc.). In this way, power can be conserved and/or other routing goals can be met, thereby improving the performance of the network-on-chip. When the performance of the network-on-chip is improved, the performance of the integrated circuit chip and systems in which the integrated circuit chip is included are also improved (such as by performing more operations in a given amount of time, using less battery power, etc.) leading to improved user satisfaction.

System

The described embodiments include an integrated circuit chip on which are fabricated a number of nodes and a network-on-chip via which the nodes communicate. FIG. 1 presents a block diagram illustrating integrated circuit chip 156 with a number of nodes 102 and a network-on-chip 104 in accordance with some embodiments. As can be seen in FIG. 1, nodes 102 include cores 106-114, which are CPU cores, GPU cores, and/or other types of processors or processing cores. Nodes 102 also include memory 116, which is a higher-capacity, slower-access memory such as a "main memory" for storing data and instructions to be used by cores 106-114 and other functional blocks in integrated circuit chip 156. Nodes 102 additionally include cache 118, which is a lower-capacity, faster-access memory that stores copies of data and/or instructions retrieved from memory 116 for quicker access by cores 106-114 and other functional blocks in integrated circuit chip 156. Nodes 102 further include input-output (10) device ("IO DEV") 120, which is an input-output device or an interface thereto such as a network or communication bus device, a mass-storage device, a peripheral device, a sensor, etc. Generally, a given node 102 performs operations according to a type of the given node, such as core 108 performing computational operations, IO device 120 providing data to or acquiring data from devices such as disk or solid-state drives, networks, etc., memory 116 storing and/or returning data and instructions, etc.

Network-on-chip 104 is an interconnect network that includes routers 122-152 arranged in a mesh topology, with separate communication links 154 (only two or which are labeled for clarity) coupled between neighboring routers in the topology. Each router 122-152 is or includes a functional block such as a router, a switch, and/or a controller that routes or otherwise directs flits to nodes and/or neighboring routers in network-on-chip 104. As can be seen in FIG. 1, some routers 122-152 are communicatively coupled to one or more nodes directly—i.e., without intervening routers. For example, router 122 is coupled directly to core 106. In contrast, some routers, i.e., intermediate routers, are communicatively coupled between two or more other routers in the topology—and are not coupled directly to nodes. For example, router 130, 138, 132, etc. are intermediate routers. During operation, a router in the network-on-chip 104 may receive a flit from a node or a neighboring router and route or direct the flit to a next router on a route to a destination node—or to the destination node or router itself.

Each communication link 154 is or includes wires/traces, guides, and possibly communication functional blocks (e.g., repeaters, buffers, etc.) implementing multi-bit, bi-directional channels used for communicating flits between routers. In some embodiments, each communication link 154 includes a number of separate channels. For example, in some embodiments, each communication link 154 includes some or all of an address channel for communicating address information between routers, a control channel for communicating control and configuration information such as operating states between routers, a data channel for communicating data between routers, etc. The number of bits in each multi-bit channel can be any number of bits, such as 32 bits, 128 bits, 1024 bits, etc.

In some embodiments, routers 122-152 use "on-the-fly" routing, for which routers individually and locally determine, based on indications of destinations in or associated with flits, which neighboring routers/communication links are to be used for routing the flits. In some embodiments, routers use "source" routing, for which one or more routers in a route from a source of a packet to a destination of a packet (e.g., a first router, etc.) determine an entire route, including routers/communication links that are to be used for routing the packet or flits. For source routing, intermediate routers route the flits based on an indication of the entire route that is included in or associated with the flits.

In some embodiments, all flits from a given packet and/or associated with a given communication session are routed on the same route and may need to be received in order. In some of these embodiments, only a subset of the flits (e.g., a first flit) carries routing information (if source routing is in use) and each flit includes one or more identifiers of the packet and/or communication session that are used to determine how the flit is to be routed. In some embodiments, flits from a given packet and/or communication session may be routed using different routes and may arrive out of order with regard to other flits from the packet and/or communication session. In some of these embodiments, each flit includes one or more identifiers of the packet and/or communication session and information, such as a sequence count, to be used for reassembling the packet at final router and/or network interface of a destination node.

In some embodiments, routers 122-152 in network-on-chip 104 communicate via communication links 154 using a specified standard or protocol such as ARM's AMBA AXI4®, ST Microelectronics' STBus®, OpenCores' Wishbone®, etc. In these embodiments, the size, arrangement, and other properties of flits and/or the width (in terms of bits), speed, and other properties of communication links and routing (e.g., in-order or out-of-order arrival of flits, multipath routing of different flits from a same packet or communication session, etc.) may be dictated by the standard or protocol in use.

In some embodiments, nodes 102 use a packet-based protocol for handling communications. In these embodiments, when communicating with a destination node (e.g., IO device 120), a source node (e.g., core 108) provides a packet that includes a header with an identification of the destination node and possibly a payload and/or tail. A receiving router (e.g., router 126) fragments or divides the packet into a number of flits for transmission through network-on-chip 104 and determines a next router for the packet (for on-the-fly-routing) or a full route to the destination node (for source routing). The receiving router then transmits the flits to the next router, and thus on the first hop of a route to the destination node. Intervening routers on the route receive the flits and may (for on-the-fly routing) determine a next router and/or communication link for routing the flits or simply use (for source routing) a specified router and/or communication link for routing the flits.

In the described embodiments, some or all of the routers and/or communication links support multiple operating states, with each operating state having a corresponding setting of one or more operating parameters, etc. (e.g., a supply voltage and clock frequency). For example, the routers and/or communication links may support a higher-power operating state and a lower-power operating state, with the lower-power operating state having relatively reduced operating parameters than the higher-power operating state. When determining a next router or a full route for flits, a given router takes into account an operating state of at least the neighboring routers and/or the corresponding communication links. The receiving router may route the flits through routers and/or communication links based on one or more route properties, such as an estimated time for flits to travel to the specified destination through the route, an estimated electrical power consumed when sending flits through the route, a number of routers and/or communication links in the route, etc. For example, when the route property is an estimated time and the goal is to have a lowest estimated time, the router may avoid routers and/or communication links that are operating in a lower-power operating state, as these routers and/or communication links may perform routing operations more slowly.

Although routers 122-152 are shown separately from nodes 106-120, in some embodiments, at least some of routers 122-152 are included in corresponding nodes 106-120. For example, in some embodiments, router 122 is fabricated in/as part of core 106, such as being included in a network interface portion of core 106. In addition, although a mesh topology is shown in FIG. 1, the described embodiments are not limited to a mesh topology. For example, a Clos topology, a butterfly topology, and/or another topology or combination thereof may be used. Generally, any topology in which routers use operating states and route properties make determinations regarding routers and/or communication links to be used for routing packets can be used. Further, although a particular number of nodes and routers is shown in FIG. 1, in some embodiments, a different number of routers and/or nodes is present. In addition, the nodes and routers may be arranged differently, such as with multiple nodes communicatively coupled (via corresponding communication links) to a single router, etc.

Integrated circuit chip 156 is simplified for illustrative purposes. In some embodiments, however, integrated circuit chip 156 and/or nodes 102 include additional or different functional blocks, subsystems, elements, and/or communication paths. For example, integrated circuit chip 156 and/or nodes 102 may include display subsystems, power subsystems, input-output (I/O) subsystems, etc. Integrated circuit chip 156 and/or nodes 102 generally include sufficient functional blocks, etc. to perform the operations herein described.

Integrated circuit chip 156 and/or nodes 102 can be, or can be included in, any device that performs computational operations. For example, integrated circuit chip 156 and/or one or more nodes 102 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Figure 2:
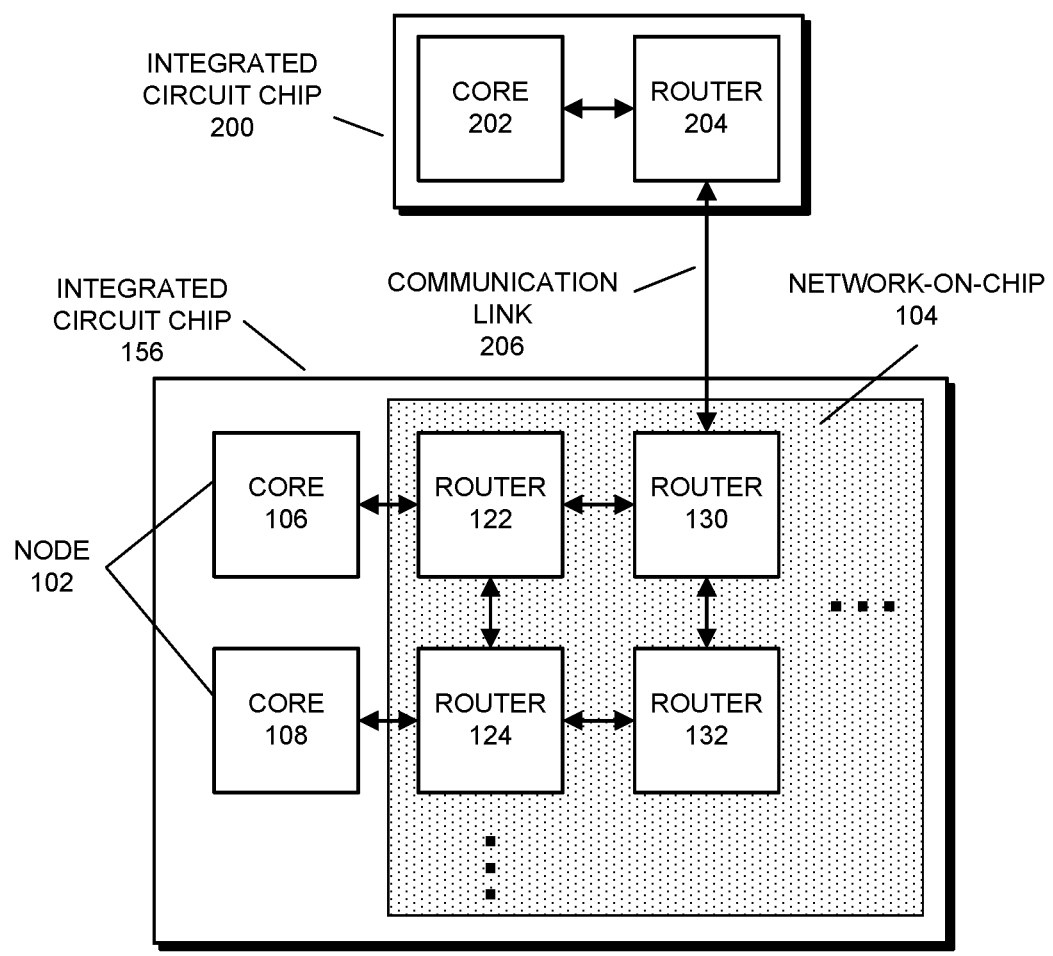
FIG. 2 presents a block diagram illustrating two integrated circuit chips for which a router in a first integrated circuit chip is communicatively coupled to a router in a network-on-chip in a second integrated circuit chip in accordance with some embodiments.

In FIG. 1, a system is illustrated in which nodes 102 and network-on-chip 104 are fabricated on/included in a single integrated circuit chip 156. The described embodiments are not limited, however, to this arrangement of elements. In some embodiments, one or more routers in a network-on-chip on a first integrated circuit chip are communicatively coupled to one or more routers in a second, separate integrated circuit chip. FIG. 2 presents a block diagram illustrating two integrated circuit chips for which a router in a first integrated circuit chip is communicatively coupled to a router in a network-on-chip in a second integrated circuit chip in accordance with some embodiments. Note that the integrated circuit chips presented in FIG. 2 are merely examples, in some embodiments, different numbers or arrangements of functional blocks and elements are present in one or both of the integrated circuit chips. For example, in some embodiments, integrated circuit chip 200 includes its own network-on-chip in which router 204 is included, includes more routers and/or nodes, etc. In FIG. 2, only a portion of the functional blocks and elements in integrated circuit chip 156/network-on-chip 104 are shown for clarity.

As can be seen in FIG. 2, integrated circuit chip 200 includes core 202 (a node), which is communicatively coupled with router 204. Router 204 is also coupled to communication link 206, which is an interconnect (serial or parallel bus, etc.) that is coupled to router 130 in network-on-chip 104. Communication is performed on communication link 206, which is an inter-chip communication link, in accordance with and using a specified protocol, such as Gen-Z®, PCI-Express®, CCIX®, I2C®, OpenCAPI®, etc.

In some embodiments, router 204 keeps a record of operating states of some or all of the plurality of routers and corresponding communication links in network-on-chip 104. Router 204 then routes flits to destination nodes in integrated circuit chip 156, e.g., cores 106-108, etc., via one or more other routers in network-on-chip 104 based at least in part on the operating states of the some or all of the plurality of routers and the corresponding communication links. For example, when source routing is in use, router 204 can indicate a complete route through the routers in network-on-chip 104 to a destination node, such as a route through routers 130-122 to core 106, etc. Generally, the operations performed by router 204 and the routers in network-on-chip 104 to enable router 204 to keep the records of operating states of routers in network-on-chip 104 and route the flits are similar to those performed by routers in network-on-chip 104.

Operating States

As described herein, routers in a network-on-chip use operating states of routers and/or communication links to determine routes to be used for routing flits to destination nodes. Generally, an operating state for a router and/or a communication link includes one or more operating parameters, settings, configurations, and/or arrangements that control the way in which the router and/or communication link performs routing of flits and/or other operations. For example, an operating state may be defined based on settings or configurations of one or more of a supply voltage, a clock frequency, electrical current, a communication or internal bus bandwidth, a maximum allowed throughput (in terms of flits processed per given amount of time), a buffer depth, a job or communication queue availability and/or capacity, a hardware or software/firmware version, a type or capacity of memory made available, etc. In some embodiments, an operating state is defined based on a combination of parameters, settings, configurations, and/or arrangements, such as based on a combination of supply voltage and clock frequency, etc.

In the described embodiments, at least some routers and/or communication links support multiple operating states, with each operating state having one or more different operating parameters, settings, configurations, and/or arrangements. Continuing the example above, each operating state may include a different combination of supply voltage and clock frequency. For instance, a first operating state may be a higher-power operating state in which supply voltage and clock frequency are set to relatively higher levels. One possible higher-power operating state is a full-power operating state, in which a router and/or communication link is operating with typical or normal full power supply voltage and clock frequency such as 1.2 V and 2 GHz. As another example, a second operating state may be a lower-power operating state in which supply voltage and clock frequency are set to relatively lower levels. One possible lower-power operating state is a low-power or throttled operating state in which a router and/or communication link is operating with reduced supply voltage and clock frequency such as 0.5 V and 600 MHz, e.g., to conserve electrical power, reduce heating of circuit elements, etc., while remaining at least partially functional and responsive. One distinction between the multiple operating states is the way in which the router and/or communication link performs routing and/or other operations, with certain operating states having lower performance than other operating states. Continuing the example above, the lower-power operating state may have lower performance (e.g., longer response times, lower communication bandwidth, resumption overhead, lower-speed circuit operation, etc.) than the higher-power operating state.

In some embodiments, the operating states of routers and/or communication links are dynamically adjusted during operation of integrated circuit chip 156. In these embodiments, the operating states of the routers and/or the communication links may be adjusted based on operating conditions (e.g., software execution phases, loads on memory or processors, temperatures of components, etc.), estimated or predicted system bandwidth demands, commands from a software application or operating system, timers, power consumption thresholds, etc. For example, when a bandwidth demand is estimated or known to be low for a particular communication link, e.g., because a corresponding node is in a lower-power operating state or powered down, the router and/or communication link can be transitioned to a lower-power operating state. Continuing the example from above in which the operating state is defined by a supply voltage and a clock frequency, the dynamic adjustment of operating states for routers and/or communication links can be called dynamic voltage and frequency scaling or DVFS.

Routing Flits in a Network-on-Chip based on Operating States of Routers

Figure 3:
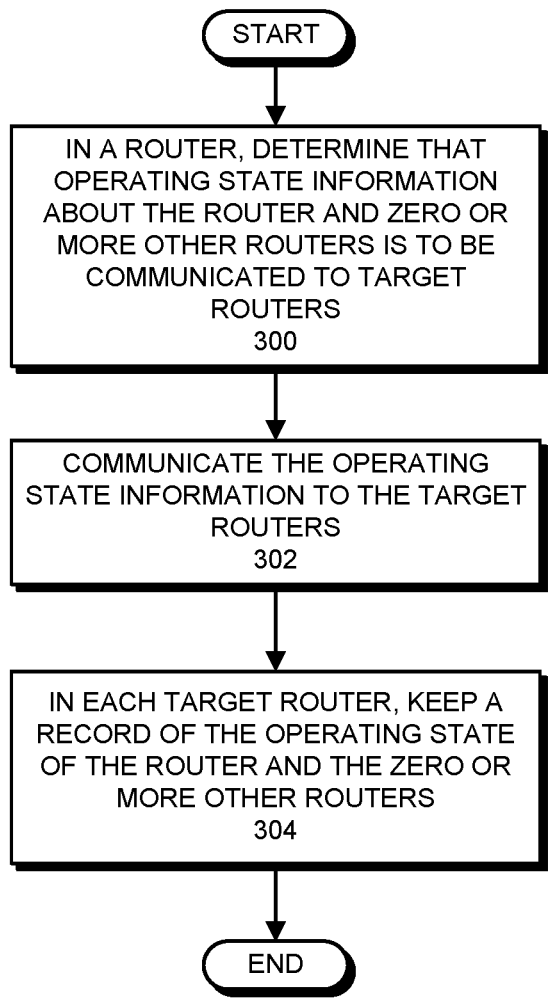
FIG. 3 presents a flowchart illustrating a process for communicating operating state information between routers in a network-on-chip in accordance with some embodiments.
Figure 4:
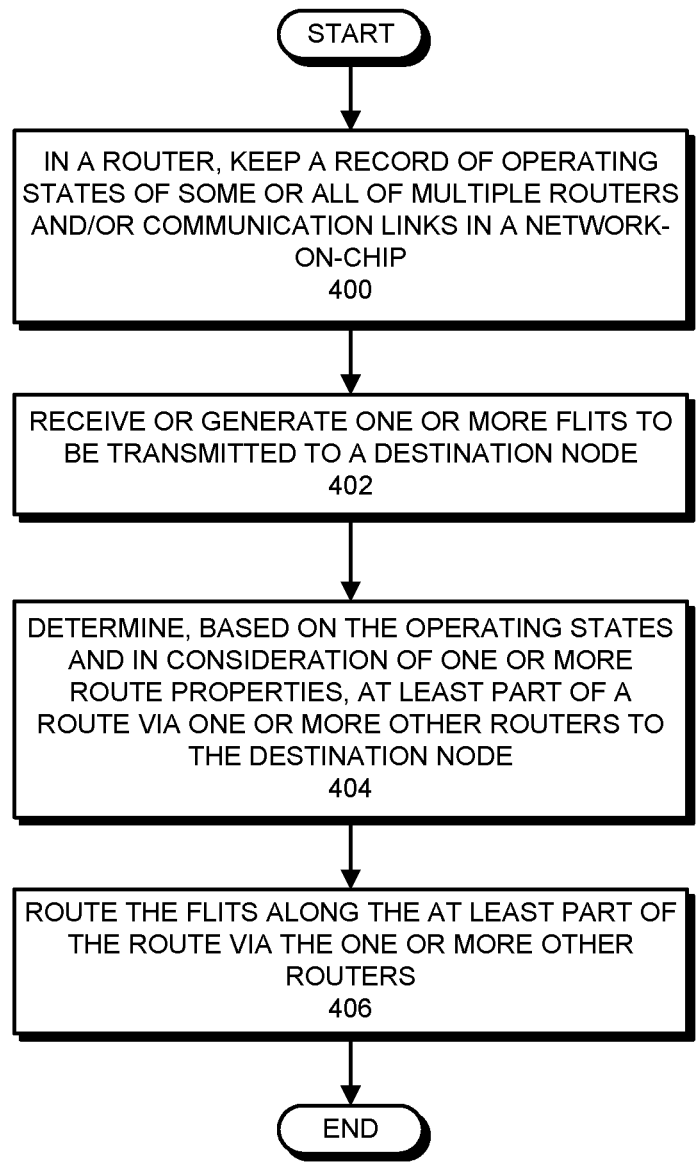
FIG. 4 presents a flowchart illustrating a process for routing flits to destination nodes based on operating states of routers in a network-on-chip in accordance with some embodiments.

In the described embodiments, routers in a network-on-chip route flits to a destination node via one or more other routers in the network-on-chip based on operating states of some or all of the routers and/or communication links in the network-on-chip. FIG. 3 presents a flowchart illustrating a process for communicating operating state information between routers in a network-on-chip in accordance with some embodiments. FIG. 4 presents a flowchart illustrating a process for routing flits to destination nodes based on operating states of routers in a network-on-chip in accordance with some embodiments. Note that the operations shown in FIGS. 3-4 are presented as a general example of operations performed by some embodiments. The operations performed by other embodiments include different operations and/or operations that are performed in a different order. For the example in FIGS. 3-4, routers in a network-on-chip (e.g., router 132, router 140, etc. in network-on-chip 104) are described as performing various operations. In some embodiments, however, different elements or functional blocks perform some or all of the described operations.

For the operations in FIGS. 3-4, it is assumed that communication links (e.g., interface elements, control elements, transmit/receive elements, etc.) in the network-on-chip are configured in an operating state associated with or otherwise based on an operating state of at least one of the routers to which the communication links are connected. For example, if a given router is in a lower-power operating state, each communication link coupled to the given router may operate in a lower-power operating state, regardless of the operating state of the other router(s) coupled to each communication link. In embodiments where the operating state is defined based on a supply voltage and clock frequency, therefore, assuming that router 140 is the given router, when router 140 is configured to operate in a lower-power operating state with lowered supply voltage and clock frequency (in contrast to a higher-powered operating state), the communication links coupled to the north, south, east, and west of router 140—i.e., coupled to routers 138, 142, 148, and 132, respectively—may also be configured to operate in the lower-power operating state (or another corresponding operating state), regardless of the operating state of routers 138, 142, 148, and 132. When all routers coupled to a communication link are in a same operating state, the communication link is configured in the corresponding operating state. Note, however, that this is not a requirement; in some embodiments, communication links are configured in operating states separately from routers and may thus be in different operating states than corresponding routers. In embodiments, where routers and communication links are separately configured, the operations of FIG. 3-4 are altered so that operating state information associated with communication links is communicated by routers and/or communication links and used by routers to determine routes.

For the operations in FIG. 3, a router communicates operating state information about the router itself and possibly other routers to target routers. In other words, a given router communicates operating state about the given router and "zero or more other routers" to target routers. For example, in some embodiments, a router such as router 132 has operating state information about itself, and may also have received operating state information from some or all of the four neighboring routers, i.e., routers 130, 134, 140, and 124 and/or other routers further removed in the network-on-chip. When communicating operating state information to a target router such as router 124, therefore, router 132 may communicate the operating state information about itself along with operating state information about other router(s) from which router 132 has received operating state information. In this way, information about the operating state of routers in the network-on-chip can "ripple" through the routers in the network-on-chip, with each router communicating operating state information about itself and other routers to target routers. In some embodiments, in order to avoid duplication, each router communicates only information about its own operating state and the operating state of specified other routers in the network-on-chip to target routers. Note, however, that communicating operating state for multiple routers is not a requirement; in some embodiments, each router simply communicates information about its own operating state to target routers.

The process shown in FIG. 3 starts when a router determines that operating state information about the router and zero or more other routers is to be communicated to target routers (step 300). For this operation, based on the occurrence of one or more specified events, the router determines that the operating state information about the router and the zero or more other routers is to be communicated to routers from among the other routers in the network-on-chip (which are called "target" routers for the example in FIG. 3 as they are destinations for the operating state information). Generally, an event can be or include any event that can be detected by the router, such as a change in an operating state of the router, an expiration of a timer or passage of a specified amount of time, a change in a hardware or software execution profile or state in the router, an execution of a triggering software subroutine by the router, a determination that a communication link is idle/busy, a detection of a given amount or type of flits having been sent or received, an initialization of the router, a performance of an error handling routine, receipt of operating state information from a given number of other routers, a receipt of a request to transmit state information from another router or entity (e.g., operating system, node, etc.), etc.

Although target "routers" are described with respect to FIG. 3, in some embodiments, the operating state information is communicated to only a single target "router." In this case, the operations of FIG. 3 are adjusted accordingly.

In some embodiments, the router also determines the target routers, such as by processing or reading a list or table of target routers, determining the target routers based on properties of routers in the network-on-chip (routers in a higher-power operating state, routers in specified directions and/or numbers of hops, etc.), etc. In some embodiments, the target routers are set, such as being neighboring routers only, routers in a specified direction, routers within a given number of hops, etc.

The router then communicates the operating state information to the target routers (step 302). How the router communicates the operating state information depends on the particular mechanism used for communicating operating state information between routers in the network-on-chip. In some embodiments, a sideband channel such as a serial or multi-line/parallel control channel is coupled between routers in the network-on-chip and the router uses the sideband channel for communicating the operating state information to the target routers. In these embodiments, one or more bit patterns or sequences, assertion/deassertion of control channel lines, etc. is used to communicate the operating state information. For example, a bit pattern that includes an identifier for each of the router and the zero or more other routers and an operating state for that router can be communicated from the router to each target router—and the target router may be neighboring routers and/or routers at a greater number of hops from the router.

In some embodiments, the router communicates the operating state information to the target routers using one or more flits transmitted on respective communication links. In other words, the router directs flits including the operating state information to one other router at a time in a point-to-point or router-to-router communication scheme. For example, the router may use one or more control flits—and possibly purpose-specific control flits—to send the operating state information to the target routers. As another example, the router may send the operating state information to the target router in a header flit alone—i.e., in a header flit that includes the operating state information, but for which there are no associated body flits. As yet another example, the router may send a header flit that indicates the target router followed by one or more body flits with the operating state information for each of the router and the zero or more other routers, etc.

In some embodiments, the routers in the network-on-chip support broadcasting information using flits on the communication links, such as by routers forwarding flits or serving as pass-throughs for flits that are broadcasted by other routers (possibly with mechanisms to prevent looping or endless propagation of flits). The broadcasted flits can be received and processed by as many as all of the other routers in the network-on-chip. In these embodiments, the router communicates the operating state information to the target routers by broadcasting one or more flits that include operating state information—and the target routers can be as many as all the other routers (or at least each router that can be reached by a broadcasted flit). As described above for the point-to-point case, the broadcasted flits may include control flits, bodiless header flits, or header and body flits, etc.—although the broadcasted flits are not directed to a particular target router alone.

When sending (i.e., point-to-point transmitting or broadcasting) the operating state information using one or more flits, the router includes the operating state information in the one or more flits accordingly. For example, the router may set operating state bits for each of the router and the zero or more other routers in fields or bits in a single flit. As another example, the router may include a router identifier followed by an operating state code for each of the router and the zero or more other routers in a dedicated field in a single flit. As another example, the router may include the operating state information for each of the router and the zero or more other routers in a separate flit, etc.

When sending the operating state information using one or more flits or via the sideband, the operating state information may be sent at a specified time—which may be the previously-described "event." For example, the operating state information may be sent at a given interval (e.g., every N milliseconds). As another example, the operating state information about or destined for a given router may be sent in a communication window dedicated to the given router (e.g., in a scheme where separate communication windows are assigned to each router in the network-on-chip). As yet another example, the operating state information may be sent during an idle period when the communication link or sideband channel is carrying low levels of other traffic. As yet another example, the operating state information may be sent during a designated idle period or "bubble" on the communication link or sideband channel.

The operating state information that is communicated from the router to the target routers includes at least information that the other routers can use to determine the operating state of the router and the zero or more other routers. For example, the operating state information can be as simple as a single bit for which each of states 0/1 represents one of two different operating states (lower-power and higher-power, etc.). As another example, a multi-bit value can be used to represent each of three or more operating states. As yet another example, a value can be used to describe or refer to a description of (e.g., as in a pointer to a memory location or register) the one or more most recent or projected transitions between operating states for the router, etc. As described above, the bit values can be associated with identifications of the routers to which they apply, such as a separate numerical identifier that is assigned to each router in the network-on-chip (e.g., at initialization, as routers are added to the network-on-chip, etc.), an address for the router in the network-on-chip, a device identifier for the router, etc. Alternatively, the operating state information can be arranged so that each operating state is associated with a known router, such as by using predetermined fields or bits within a flit or signal or message on a control channel, etc.—meaning that identifications of the routers may not be directly included with the operating state information.

In some embodiments, each router maintains only operating state information about its neighboring routers—and may only communicate operating state information to neighboring routers. For example, in some embodiments, routers that are configured for on-the-fly routing may only use information about routers and/or communication links that are directly coupled to the router, i.e., neighbors of that router, for determining a next communication link and/or router on which flits are to be routed. Note, however, that two or more hops of routers may be considered for on-the-fly routing in some embodiments and corresponding operating state information is therefore kept by—and communicated to—routers in the network-on-chip.

Upon receiving the operating state information, each target router keeps a record of the operating state of the router and the zero or more other routers (step 304). For this operation, a receiving target router receives the operating state information and stores the operating state information in a table, list, or one or more memory location(s) for subsequent retrieval and use in determining routes for flits.

As described above, FIG. 4 presents a flowchart illustrating a process for routing flits to destination nodes based on operating states of routers and/or communication links in a network-on-chip in accordance with some embodiments. The process shown in FIG. 4 starts when a router keeps a record of operating states of some or all of the routers and/or communication links in the network-on-chip (step 400). As described above for step 304 in FIG. 3, this operation involves the router receiving, from one or more other routers, operating state information that indicates the operating state for some or all of the routers in the network-on-chip and storing the received operating state information. For example, the router may store a table, string, or other data structure that includes a specification of the operating state of the some or all of the routers in the network-on-chip. For instance, if each router can be in one of four operating states, a two-bit value can be kept in a register, memory location, or bit string for each router that indicates the current (or at least last-known) operating state for that router. Recall that, for the examples in FIGS. 3-4, the communication links are configured in operating states based on or associated with the operating states of the routers to which the communication links are coupled—and so the operating states of communication links can be determined or inferred from the operating states of corresponding routers.

By keeping a record of "some or all" of the routers in the network-on-chip, the router keeps records of the operating states of sufficient routers to enable the determining of routes and routing of flits in steps 402-404. For example, in some embodiments, the router keeps a record of all of the other routers in the network-on-chip, as might be used for source routing. As another example, in some embodiments, the router keeps a record of routers within a specified number of hops, such as neighboring routers (one hop), etc., as might be used for on-the-fly routing. In some embodiments, if operating state information for a given router is not current (e.g., is older than a threshold amount of time) and/or available at a router, that router assumes a default (and possibly conservative) operating state, such as an operating state in which the router is less likely to be used in a route.

The router then receives or generates one or more flits to be transmitted to a destination node (step 402). For this operation, the router may receive the one or more flits from another/upstream router via a corresponding communication link in the network-on-chip, such as router 124 receiving the one or more flits from one of router 122, 126, or router 132. Alternatively, the router may receive a packet or other information from a source such as a node and generate the one or more flits therefrom, such as by dividing an N-byte packet received from a node into a number of M-bit flits. The received or generated flits include or are associated with (e.g., in an original packet, in a prior flit, etc.) an identification of the destination node to which the one or more flits are to be transmitted. In some embodiments, the router performs one or more operations to determine the destination node, e.g., parsing an associated header flit to determine the destination node, reading a record corresponding to the one or more flits, etc.

The router next determines, based on the operating states of the some or all of the routers and one or more route properties, at least part of a route via one or more other routers to the destination node (step 404). For this operation, the router determines at least a next/neighboring router to which the one or more flits are to be transmitted (as with on-the-fly routing), and may determine a complete route through the network-on-chip to the destination node (as with source routing). Note that, when only the next/neighboring router is determined, the next/neighboring router may be a first router on a route to the destination node and each router on the route may determine a next router to which the one or more flits are to be sent until the one or more flits are forwarded to the destination node by a final router on the route.

For determining the at least part of the route, the operating states of the routers and/or communication links are considered in view of one or more route properties, which are properties that are desired for the route. For example, in some embodiments, the route properties include an estimated time for flits to be routed to the specified destination through the route, with the desired route property being to minimize the estimated time, for the time to be less than a threshold or target amount of time, etc. As another example, in some embodiments, the route properties include an estimated electrical power consumed when routing flits through the route, with the desired route property being to minimize the electrical power consumed, for the electrical power consumed to be less than a target or threshold amount of electrical power, etc. As yet another example, in some embodiments, the route properties include a number of routers and/or communication links or "hops" in the route, with the desired route property being to minimize the number of hops, for the number of hops to be less than a target or threshold number of hops, etc. As yet another example, in some embodiments, the route properties include an amount of congestion of some or all of the plurality of routers and the corresponding communication links, with the desired route property being to use routers and corresponding communication links that are experiencing less congestion, etc. As yet another example, in some embodiments, the route properties include a number of clock domain boundaries that are crossed on the route, with the desired route property being to use routers and corresponding communication links that are in matching clock domains. Note that a clock domain boundary is "crossed" when routers and/or communication links are operating at different clock frequencies and a conversion between clock frequencies may need to be made in order to transmit flits from a router and/or communication link having a first clock frequency to a router and/or communication link having a second, different clock frequency.

For determining the at least part of the route, the router also, possibly using data structures such as matrices, trees, tables, etc., computes or calculates the at least part of the route to meet or be in accord with the one or more route properties based on the operating states. For example, in some embodiments, the router assigns cost values to each router and/or communication link that is a candidate for being used in the at least part of the route and then computes a lowest-cost at least part of the route. In these embodiments, candidate routers that are less desirable can have a penalty added to their cost, thereby increasing the cost to decrease the likelihood that the lowest-cost route will pass through such routers. For example, if the route property is a shortest estimated time of transit and a router is in a lower-power operating state (so that the router responds and transmits flits more slowly), the router may have a penalty added to its cost—meaning that the cost of using the router in a route is more than instead using a router in a higher-power operating state. In contrast, in these embodiments, a router in a higher-power operating state may not have the penalty added to its routing value. As another example, a preferential or default path through the network-on-chip may be defined between the router and each destination node and determining the route can include, when routers on the preferential or default path are in a less-desirable operating state, determining a route that varies the least from the preferential or default path (e.g., follows the closely, has a closest number of hops, etc.). As yet another example, a number of predetermined paths to destinations (e.g., computed paths, previously used paths, paths indicated by another entity, etc.) may be stored in the router and a best-matching of the predetermined paths may be used, such as a predetermined path that has the most routers in a given operating state. As another example, the routers in the network-on-chip can be divided into two or more zones and the routers in a zone with the most/least routers in a given operating state can be selected for subsequent use in determining the route (e.g., to avoid computing all routes through the network-on-chip).

The router then routes the one or more flits along the at least part of the route via the one or more other routers (step 406). For this operation, the router sends, via a corresponding output port, output functional block, or network interface, the one or more flits to the next router in the route. As described above, this may mean sending the one or more flits to a neighboring router that is the only router in the route, as with on-the-fly routing. Alternatively, this may mean sending the one or more flits to a neighboring router that is the first router in a complete route to the destination node, which can involve operations such as sending an indication of the complete route in or associated with the one or more flits (as in a newly generated header flit that accompanies the one or more flits, etc.). Sending the one of more flits can involve operations such as forwarding the one or more flits through an internal switch or packet directing functional block (e.g., an internal memory in the router, etc.) in such a way that the one or more flits are directed from an input port, input functional block, or network interface to the output port, output functional block, or network interface.

Figure 5:
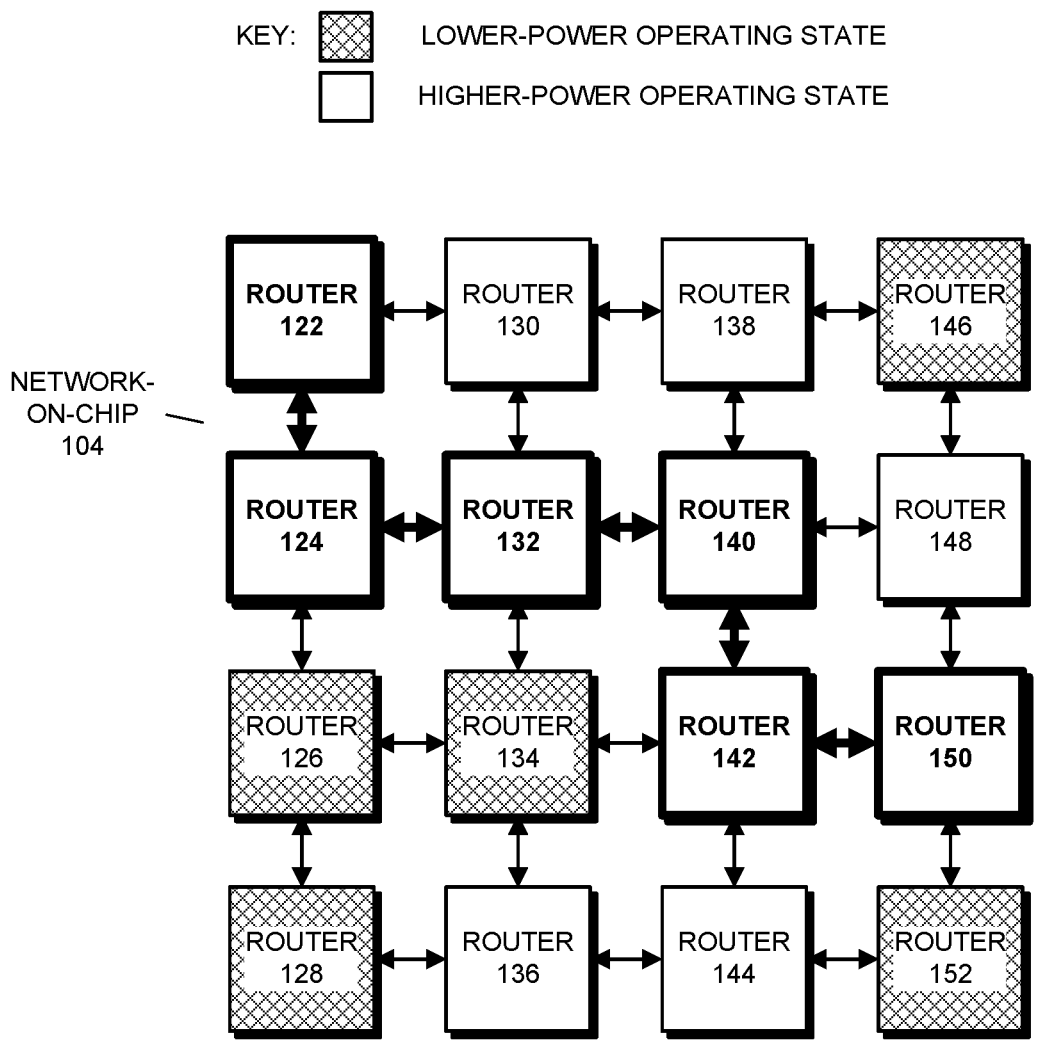
FIG. 5 presents a block diagram illustrating a route in a network-on-chip in accordance with some embodiments.

FIG. 5 presents a block diagram illustrating a route in a network-on-chip in accordance with some embodiments. Note that FIG. 5 presents one example of a topology of a network-on-chip and a route; in some embodiments one or both of a different topology and a different route are used. For instance, although a particular number and arrangement of routers and communication links is shown in the topology in the network-on-chip in FIG. 5, in some embodiments, a different number and/or topology of routers and/or communication links is in the network-on-chip.

For the example in FIG. 5, the routers and communication links are assumed to support at least two operating states, a lower-power operating state in which a supply voltage and clock frequency are set to relatively lower values (e.g., 0.7 V and 500 MHz) and a higher-power operating state in which the supply voltage and clock frequency are set to relatively higher values (e.g., 1 V and 1.2 GHz). In the lower-power operating state, a given router and the corresponding communication links consume less electrical power for performing routing operations, but respond and/or operate more slowly and therefore routes flits more slowly.

Although not shown in FIG. 5, the routers and/or communication links may be dynamically set to a given operating state, such as being transitioned from the higher-power operating state to the lower-power operating state to avoid consuming electrical power, etc. The routers that are set in the lower-power operating state are shown using cross-hatching in FIG. 5 and include routers 126, 128, 134, 146, and 152. The routers that are set in the higher-power operating state are shown with solid white fill in FIG. 5 and include routers 122, 124, 130, 132, 136, etc.

For the example in FIG. 5, the routers are assumed to use source routing and thus a given router, such as a first router in a route, determines a complete route to a destination node for flits. The given router for the example in FIG. 5 is router 122 and the destination node is a node coupled to router 150, e.g., cache 118 (shown in FIG. 1, but not FIG. 5). For the operations in FIG. 5, router 122 receives a packet from node 106 (shown in FIG. 1, but not FIG. 5), generates the flits therefrom, and routes the flits through router 150 to the destination node. Although an example is presented using source routing, on-the-fly routing works similarly, albeit with only a next router determined by each router along the route.

As described for FIG. 4, router 122 in FIG. 5 keeps a record of the operating state of the routers and/or communication links in the network-on-chip, which are received from other routers as described in FIG. 3. As part of the operation of generating flits, router 122 reads destination node information from the received packet (or receives the destination node information from elsewhere) and identifies the destination node. Router 122 then determines, based on the operating states of the routers in the record and in consideration of a specified route property, the route through the network-on-chip to the destination node. For the example in FIG. 5, the specified route property is the estimated time for flits to travel to the specified destination node through the route and the desired property is a lower estimated time—i.e., faster transit through the network-on-chip. Router 122 therefore determines a route through the network-on-chip that has a faster transit time, which generally means routing the flits through routers that are in the higher-power operating state. Although various paths through the network-on-chip are equivalent with regard to passing through routers in the higher-power operating state, router 122 determines a route through the sequence of routers 122-124-132-140-142-150, as shown in bold in FIG. 5. When determining the route, router 122 may use, in addition to the operating states of the routers and the route properties, rules, guidelines, etc. that control how routes proceed through the network-on-chip. For example, a north/south-then-east/west routing scheme may be used, so the route from each router proceeds north-south/up-down within the network-on-chip if possible or until a desired row is reached and then east-west/left-right, alternating if necessary until a desired final router is reached. As another example, a non-looping and/or lowest-hop count routing scheme may be used.

Router 122 then routes flits using the determined route, i.e., sends flits to router 124 with an indication that the flits should be routed using the above-described route. For example, router 122 may incorporate a description of the route such as a turn-by-turn description of the route, a list of the routers and/or communication links or directions to be used, etc. The flits proceed through the route, eventually arriving at router 150, which reassembles the packet therefrom (or performs error handling if one or more flits are not received) and delivers the reassembled packet to the destination node.

Route Modification

In some embodiments in which source routing is in use, intervening routers on a route to a destination node may modify or replace an existing route indicated by a previous router on the route. In these embodiments, in a similar way to the route determination in FIGS. 4-5, an intervening router can determine a new route through one or more routers to a destination node. For example, the intervening router may periodically and automatically determine new routes to some or all destination nodes, may determine new routes upon receiving flits destined for the destination node, etc. The intervening router can then compare the new route to the existing route to determine if there is a sufficient difference between the routes to warrant replacement (i.e., if there is more than N ms difference, if there are a same number or fewer hops in the route, etc.). When there is a sufficient difference, the intervening router can replace the existing route with the new route, such as by overwriting a header flit or other route information.

In some of these embodiments, the modification or replacement of the route can occur when one or more flits have already been sent to the destination node on the existing route, and thus only remaining flits are sent on the new route. In these embodiments, the network-on-chip should support out of order reception and/or multi-path flit transmission. For example, the final router should be able to reassemble a packet from the flits, regardless of an arrival order and/or a route taken by each of the flits.

In some embodiments, a system (e.g., nodes 102, network-on-chip 104, and/or some portion thereof) uses code and/or data stored on a non-transitory computer-readable storage medium to perform some or all of the operations herein described. More specifically, the system reads the code and/or data from the computer-readable storage medium and executes the code and/or uses the data when performing the described operations. A computer-readable storage medium can be any device, medium, or combination thereof that stores code and/or data for use by a system. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), functional blocks, system management units, power controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., network-on-chip 104, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the system performs a first operation, a second operation, etc.," the system performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A system, comprising:
an integrated circuit chip;
a network-on-chip on the integrated circuit chip, the network-on-chip including:
a plurality of routers arranged in a topology, some or all of the routers of the plurality of routers being dynamically configurable to operate in an operating state selected from among a first operating state and a second operating state, wherein one or more operating parameters in the first operating state are set to reduced values relative to a setting for the one or more operating parameters in the second operating state; and
a separate communication link coupled between each router and each of one or more neighboring routers of that router among the plurality of routers in the topology; and
a plurality of nodes on the integrated circuit chip, each node coupled to a router of the plurality of routers;
wherein a given router of the plurality of routers:
keeps a record of operating states of some or all of the plurality of routers and corresponding communication links; and
routes flits to destination nodes via one or more other routers of the plurality of routers based at least in part on the operating states of the some or all of the plurality of routers and the corresponding communication links.

2. The system of claim 1, wherein the given router:
receives or generates one or more flits that are to be routed via the network-on-chip to a specified destination node;
determines at least part of a route via one or more other routers to the specified destination node based on the operating states of the some or all of the plurality of routers and the corresponding communication links and in consideration of one or more route properties; and
uses the at least part of the route to route the one or more flits to the specified destination node.

3. The system of claim 2, wherein the route properties include one or more of:
an estimated time for flits to be routed to the specified destination node through the route;
an estimated electrical power consumed when routing flits to the specified destination node through the route; and
a number of routers and/or communication links in the route.

4. The system of claim 3, wherein the route properties further include an amount of congestion of some or all of the plurality of routers and the corresponding communication links.

5. The system of claim 3, wherein the route properties further include a number of clock domain boundaries that are crossed on the route.

6. The system of claim 2, wherein the given router is configured for source routing, so the given router determines a complete route for the one or more flits to the specified destination node.

7. The system of claim 2, wherein the given router is configured for on-the-fly routing, so the given router determines only a first router for the one or more flits, and the first router and any subsequent routers determine a remaining route to the specified destination node.

8. The system of claim 1, further comprising:
a separate sideband channel coupled between each router and each of one or more neighboring routers of that router among the plurality of routers in the topology;
wherein each router communicates operating state information to one or more neighboring routers of that router using respective sideband channels, the operating state information including an indication of an operating state of that router and zero or more other routers from which that router has received operating state information.

9. The system of claim 1, wherein each router communicates operating state information to one or more neighboring routers of that router using one or more flits transmitted on respective communication links, the operating state information including an indication of an operating state of that router and zero or more other routers from which that router has received operating state information.

10. The system of claim 1, wherein each router broadcasts one or more flits that include operating state information to other routers of the plurality of routers in the network-on-chip on respective communication links, the operating state information including an indication of an operating state of that router and zero or more other routers from which that router has received operating state information.

11. The system of claim 1, further comprising:
an additional integrated circuit chip separate from the integrated circuit chip, the additional integrated circuit chip including:
at least one additional router; and
a separate communication link coupled between the at least one additional router and each of one or more neighboring routers for the at least one additional router from among the plurality of routers on the integrated circuit chip;
wherein the at least one additional router:
keeps a record of operating states of some or all of the plurality of routers and corresponding communication links; and
routes flits to destination nodes via one or more other routers of the plurality of routers based at least in part on the operating states of the some or all of the plurality of routers and the corresponding communication links.

12. The system of claim 1, wherein:
the given router receives the at least some of the flits from another router; and
routing the flits to the destination nodes via one or more other routers of the plurality of routers includes:
updating existing routes indicated in or associated with the flits to new routes to the destination node based at least in part on the operating states of the some or all of the plurality of routers and the corresponding communication links.

13. The system of claim 1, wherein the one or more operating parameters in the first operating state that are set to reduced values relative to the setting for the one or more operating parameters in the second operating state include one or more of a supply voltage and a clock frequency.

14. A method for routing flits in a network-on-chip in an integrated circuit chip that includes the network-on-chip and a plurality of nodes, wherein the network-on-chip includes a plurality of routers arranged in a topology and a separate communication link coupled between each router and each of one or more neighboring routers of that router among the plurality of routers in the topology, and wherein each node is coupled to a router of the plurality of routers, the method comprising:
keeping, by a given router of the plurality of routers, a record of operating states of some or all of the plurality of routers and corresponding communication links, wherein some or all of the routers of the plurality of routers are dynamically configurable to operate in an operating state selected from among a first operating state and a second operating state, wherein one or more operating parameters in the first operating state are set to reduced values relative to a setting for the one or more operating parameters in the second operating state; and
routing, by the given router, flits to destination nodes via one or more other routers of the plurality of routers based at least in part on the operating states of the some or all of the plurality of routers and the corresponding communication links.

15. The method of claim 14, wherein routing flits to destination nodes comprises:
receiving or generating one or more flits that are to be routed via the network-on-chip to a specified destination node;
determining at least part of a route via one or more other routers to the specified destination node based on the operating states of the some or all of the plurality of routers and the corresponding communication links and in consideration of one or more route properties; and
using the at least part of the route to route the one or more flits to the specified destination node.

16. The method of claim 15, wherein the route properties include one or more of:
an estimated time for flits to be routed to the specified destination node through the route;
an estimated electrical power consumed when routing flits to the specified destination node through the route; and
a number of routers and/or communication links in the route.

17. The method of claim 16, wherein the route properties further include an amount of congestion of some or all of the plurality of routers and the corresponding communication links.

18. The method of claim 16, wherein the route properties further include a number of clock domain boundaries that are crossed on the route.

19. The method of claim 14, wherein the network-on-chip further includes a separate sideband channel coupled between each router and each of one or more neighboring routers of that router among the plurality of routers in the topology, and wherein the method further comprises:
communicating, by each router, operating state information to one or more neighboring routers of that router using respective sideband channels, the operating state information including an indication of an operating state of that router and zero or more other routers from which that router has received operating state information.

20. The method of claim 14, further comprising:
communicating, by each router, operating state information to one or more neighboring routers of that router using one or more flits transmitted on respective communication links, the operating state information including an indication of an operating state of that router and zero or more other routers from which that router has received operating state information.

21. The method of claim 14, further comprising:
broadcasting, by each router, one or more flits that include operating state information to other routers of the plurality of routers in the network-on-chip on respective communication links, the operating state information including an indication of an operating state of that router and zero or more other routers from which that router has received operating state information.

22. The method of claim 14, wherein an additional integrated circuit chip separate from the integrated circuit chip is coupled to the integrated circuit chip, wherein the additional integrated circuit chip includes at least one additional router and a separate communication link coupled between the at least one additional router and each of one or more neighboring routers for the at least one additional router from among the plurality of routers on the integrated circuit chip, and wherein the method further comprises:
keeping, by the at least one additional router, a record of operating states of some or all of the plurality of routers and corresponding communication links; and routing, by the at least one additional router, flits to destination nodes via one or more other routers of the plurality of routers based at least in part on the operating states of the some or all of the plurality of routers and the corresponding communication links.

23. The method of claim 14, further comprising:

receiving, by the given router, the at least some of the flits from another router, wherein routing the flits to the destination nodes via one or more other routers of the plurality of routers includes:

updating existing routes indicated in or associated with the flits to new routes to the destination node based at least in part on the operating states of the some or all of the plurality of routers and the corresponding communication links.

24. The method of claim 14, wherein the one or more operating parameters in the first operating state that are set to reduced values relative to the setting for the one or more operating parameters in the second operating state include one or more of a supply voltage and a clock frequency.

* * * * *